Inventor
Peyton S. Coles,
By Siggers + Adams
Attorneys

July 21, 1931. P. S. COLES 1,815,834
WINDSHIELD
Filed Oct. 30, 1928 3 Sheets-Sheet 2

Inventor
Peyton S. Coles
By Siggers + Adams
Attorneys

July 21, 1931.  P. S. COLES  1,815,834
WINDSHIELD
Filed Oct. 30, 1928   3 Sheets-Sheet 3

Inventor
Peyton S. Coles.
By Siggers & Adams
Attorneys

Patented July 21, 1931

1,815,834

UNITED STATES PATENT OFFICE

PEYTON S. COLES, OF ATLANTA, GEORGIA

WINDSHIELD

Application filed October 30, 1928. Serial No. 315,994.

This invention relates to windshields and, among other objects, aims to provide an improved windshield for the tonneau of an automobile to protect the occupants of the rumble seat.

In the accompanying drawings.

Figure 1:
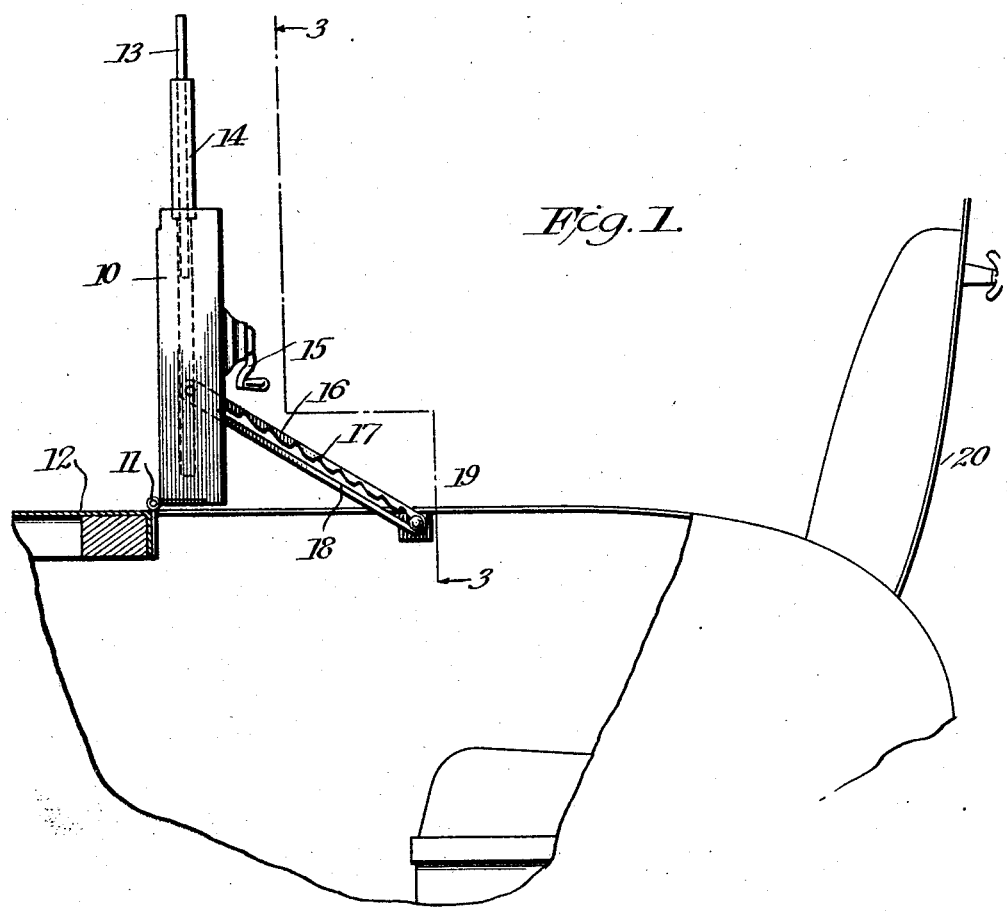
Fig. 1 is a fragmentary side elevation, partly broken away and partly in section, showing one embodiment of the invention.
Figure 2:
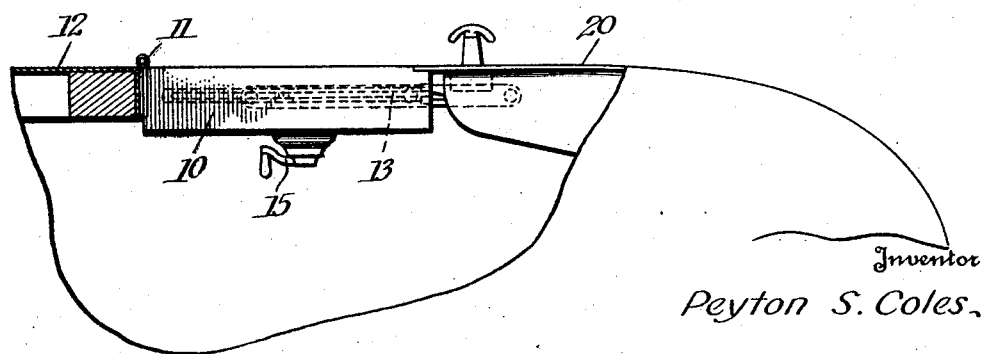
Fig. 2 is a similar side elevation showing the windshield in closed position.
Figure 3:
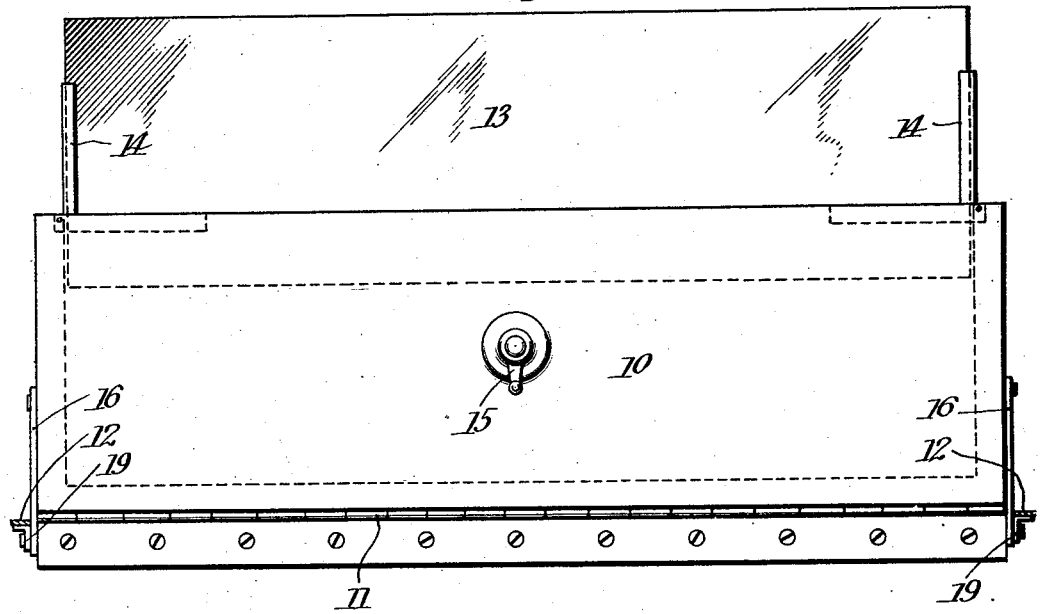
Fig. 3 is a rear elevation of the windshield and taken on the line 3—3 of Fig. 1.

Referring particularly to the drawings, there is shown in Figs. 1, 2 and 3, one type of windshield embodying the invention applied to the tonneau of an automobile which either has a hinged section in front of the tonneau cover or well or is specially provided with a hinged section to carry the windshield, the idea being to permit the windshield to be swung upwardly and raised while it is in service and to be closed so that it is housed within the tonneau when it is not in service, whereby the housing for the windshield constitutes a part of the closed tonneau.

Figure 6:
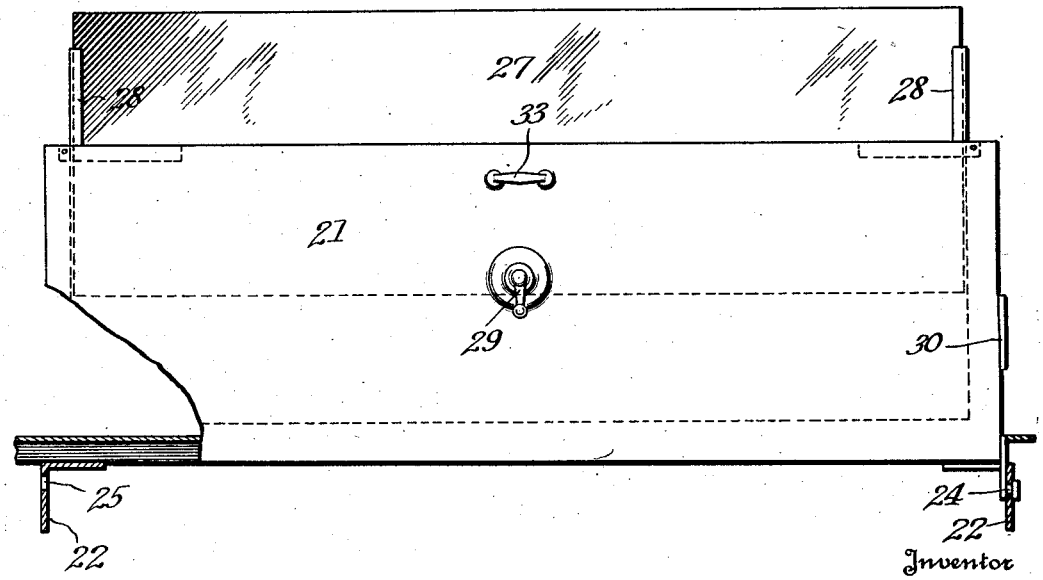
Fig. 6 is a fragmentary elevation and sectional view taken on the line 6—6 of Fig. 4.

In the example shown, there is provided a windshield housing or casing 10 which is conveniently rectangular and which may be made of sheet metal. The forward edge of the housing is preferably hinged to the front edge of the tonneau opening by means of suitable hinges 11 so that when the housing is closed, as shown in Fig. 2, the upper surface is continuous with the upper surface 12 of the tonneau. A suitable glass panel 13 is slidably mounted in channels within the housing in a well known manner and, if desired, channel members 14 may be pivoted to the housing so that they will swing upwardly and act as guides when the glass is raised. In the present instance, the channel guide members will swing down over the top edge of the glass when it is retracted (see Figs. 3 and 6). The operating means is shown as being an ordinary hand crank 15.

To hold the windshield and its housing in a vertical position, as shown in Fig. 1 or in other adjusted positions to protect the rumble seat passengers, hinged braces 16 are pivotally connected at one end to the housing and have a plurality of notches 17 on the upper sides of elongated slots 18 adapted to engage stationary pins or buttons 19 secured within the tonneau. This arrangement is such that, when the windshield housing is swung upwardly, the notches automatically engage the pins 19 and sustain it in any position. The braces may be disengaged from the pins 19 by lifting them after the windshield has been retracted into the housing, so that the housing may be swung down to its closed position in much the same fashion as the tonneau cover. This style or type of windshield is well adapted to be used as an attachment for that type of open car which has a hinged section in advance of the usual tonneau cover 20.

Figure 4:
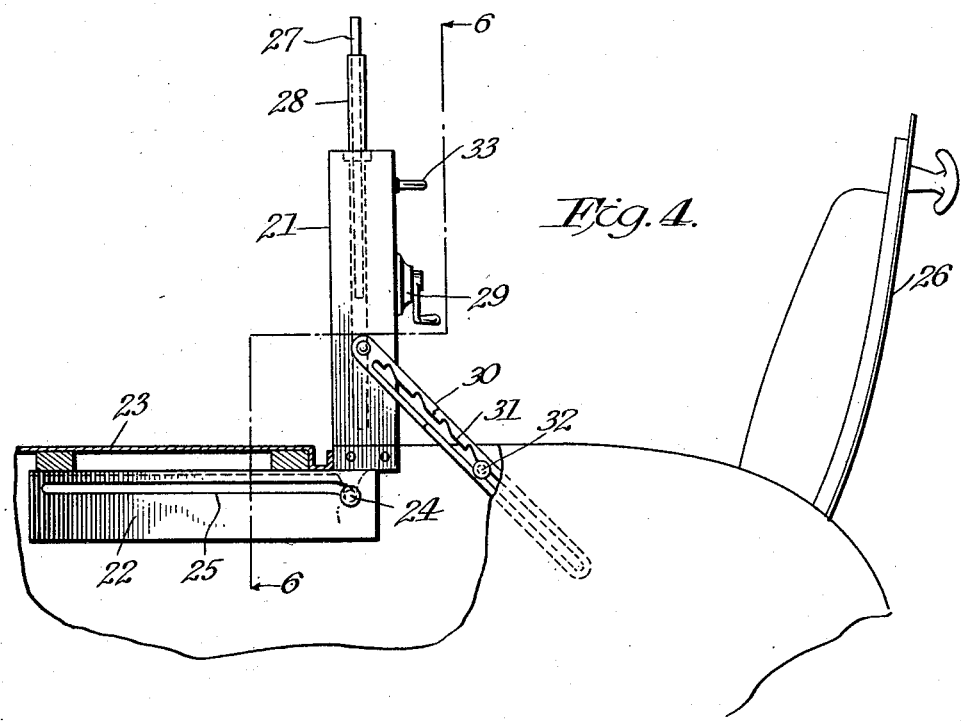
Fig. 4 is a side elevation, partly broken away and partly in section, showing a modified form of windshield applied to the tonneau.
Figure 5:
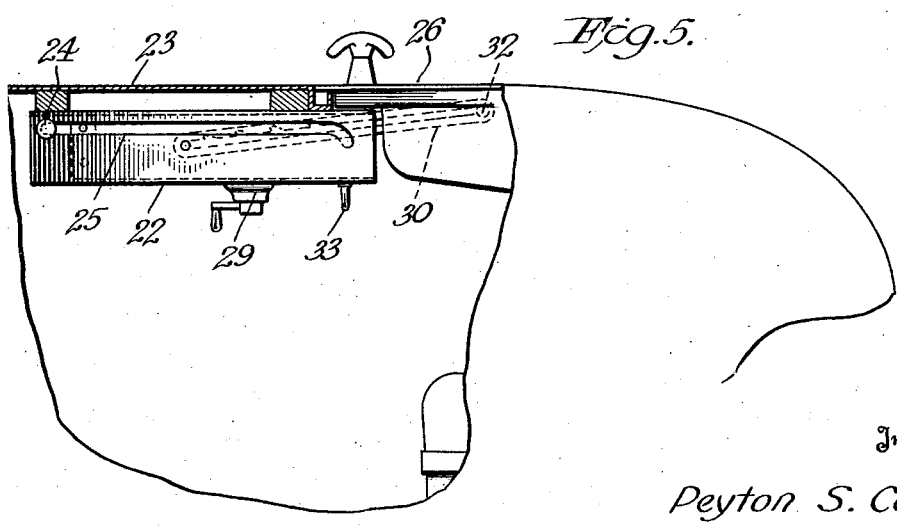
Fig. 5 is a similar view showing the windshield housed within the tonneau.

In Figs. 4 and 5 there is shown a vanishing or disappearing windshield adapted to be made as an attachment and applied to automobiles of the type in which there is no hinged section in advance of the tonneau opening or well. In this instance, the windshield housing 21 is shown as being pivotally and slidably connected to a pair of substantially horizontal angle or track members 22 secured under the tonneau 23 in advance of the well or opening. The housing 21 is conveniently somewhat similar to the housing 10 shown in Fig. 1 but has trunnion projections 24 adapted to work in horizontal slots 25 in the angle brackets 22, the idea being to permit the whole windshield housing to be moved to the position shown in Fig. 5 so that the usual tonneau cover 26 may be closed without being interfered with by the windshield attachment. As will be seen in Fig. 4, the housing is also shown as having a slidable glass panel 27 and extensible channel members or guides 28. The glass panel and the guides may be operated by the usual hand crank 29 or any other approved operating mechanism.

To support the windshield housing in adjusted positions, there are shown pivoted, notched braces 30 somewhat similar to the braces 16 shown in Fig. 1, but having elongated slots 31 to permit the housing to be slid to its extreme forward position within the tonneau without being stopped by the pins 32.

In order that an occupant of the rumble seat may operate the windshield or pull it out of its housed position, there is shown a handle 33 which extends downwardly, as shown in Fig. 5, so that it may be grasped and the whole housing pulled rearwardly until the trunnions 24 reach the rear curved ends of the slots 25. The housing is then swung upwardly to the desired adjusted position and locked or supported in such adjusted positions by the notches in the brace bars 30.

In some instances, the housing for the glass panels may be dispensed with. This is true if the width of the well or opening in the tonneau is sufficient to permit a single, wide glass panel to be swung out. The idea of providing the housing is to enable the windshield attachment to be made in telescoping sections so that it can swing within a relatively small radius. Also, a number of other changes in details of construction may be made without departing from the spirit of the invention.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:—

1. A windshield attachment for automobile tonneaus having rumble seats, comprising, in combination, a housing movably connected to a stationary portion of the tonneau at the forward portion of the tonneau opening; a windshield panel slidably connected in the housing; means for sliding the windshield panel and braces for holding the housing in adjusted positions.

2. A windshield for automobile tonneaus having rumble seats comprising, in combination, a housing pivotally connected to a stationary part of the tonneau adjacent to the forward edge of the tonneau opening; a glass panel slidable in the housing; means for sliding the panel; and hinged braces for supporting the housing in adjusted positions.

3. In combination with an automobile having a rumble seat, a windshield; a windshield housing pivotally connected to the tonneau; pivoted, slotted braces for supporting the windshield in different adjusted angular positions; and means to adjust the windshield in the housing, said housing being arranged to conceal the windshield within the tonneau when the tonneau is closed.

In testimony, that I claim the foregoing as my own, I have hereto affixed my signature.

PEYTON S. COLES.